(12) United States Patent
Sawyer, Jr.

(10) Patent No.: US 6,406,047 B1
(45) Date of Patent: Jun. 18, 2002

(54) TOMMY TWO DRIVE BICYCLE

(76) Inventor: Thomas Kidder Sawyer, Jr., 308 Oyster La., Virginia Beach, VA (US) 23456

( * ) Notice: Subject to any disclaimer, the term of this patent is extended or adjusted under 35 U.S.C. 154(b) by 0 days.

(21) Appl. No.: 09/406,677

(22) Filed: Sep. 27, 1999

Related U.S. Application Data

(63) Continuation-in-part of application No. 08/850,112, filed on May 1, 1997, now abandoned.

(51) Int. Cl.$^7$ ................................. B62M 1/02

(52) U.S. Cl. ....................... 280/230; 280/287

(58) Field of Search ............... 280/230, 235, 280/274, 278, 281.1, 287, 270

(56) References Cited

U.S. PATENT DOCUMENTS 3,015,498 A * 2/1962 Tanaka et al.
4,579,360 A * 4/1986 Nishimura et al. ......... 280/278
5,116,629 A * 5/1992 Schroeder et al. ......... 426/545

FOREIGN PATENT DOCUMENTS

GB      2 240 523    * 7/1991

* cited by examiner

Primary Examiner—Kevin Hurley
(74) Attorney, Agent, or Firm—Thomas K. Sawyer

(57) ABSTRACT

A bicycle having a front and rear wheel geared capability. A bicycle having both front and rear wheel gear controlled and chain driven. A bicycle frame where the front and rear halves pivot on a vertical center section. A steering mechanism that is controlled by the front handlebar that rotates a gear that is meshed with notches on the front end of the steering cable assembly. A center double sprocket system that is connected to drive gears on the front and rear axles by a fixed bar with pivot capabilities, and are chain driven.

6 Claims, 5 Drawing Sheets

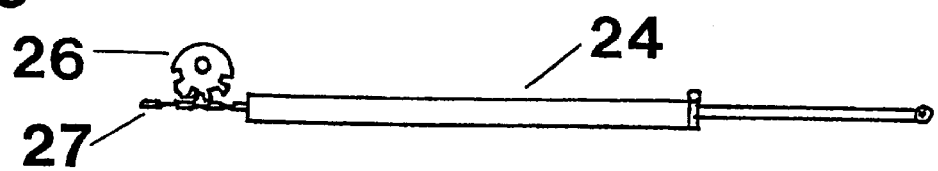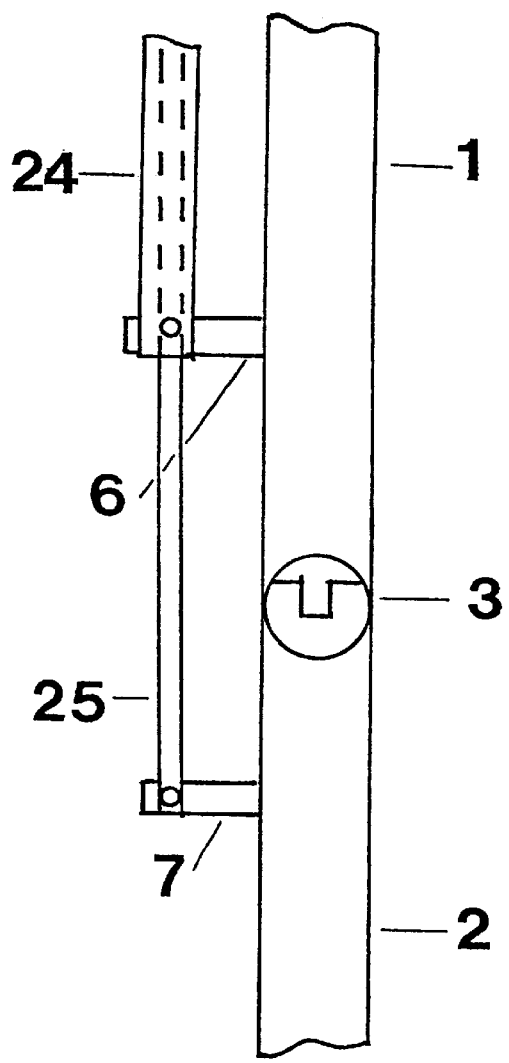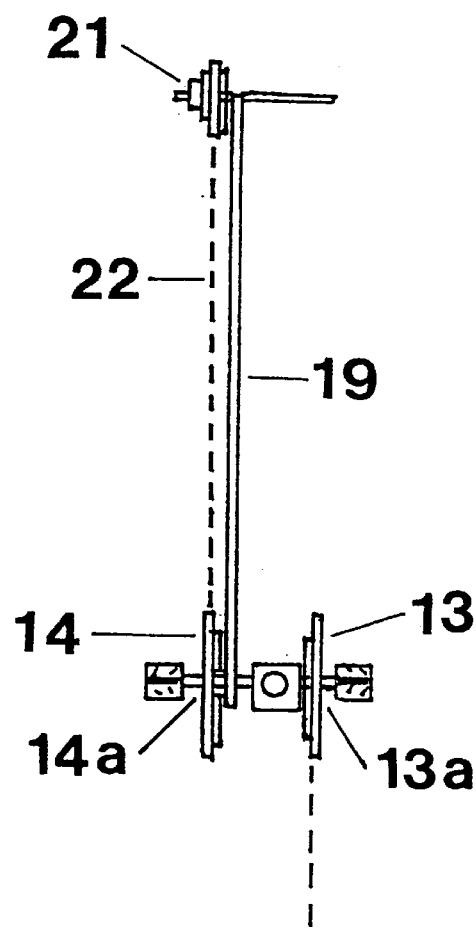

TOMMY TWO DRIVE BICYCLE

This application is a continuation-in-part of prior application Ser. No. 08/850,112, now abandoned.

BACKGROUND OF THE INVENTION

Bicycles have been around for a long time. There is a growing section of bicycle enthusiasts who are turning to the so called "Mountain Bikes" in order to attempt to conquer rugged terrain. There is not a front and rear drive bicycle on the market. This invention is attempting to provide an ultimate bicycle to enjoy and conquer even more rugged terrain by introducing a front and rear drive bicycle. This invention offers hope of high-tech rough terrain adventure by providing a means of converting human energy into mechanical means where by both ends of the bicycle are working to achieve conquering of difficult terrain. This invention relates, in general, to a bicycle having a two wheel drive capability. The front and rear axles are both gear controlled and chain driven. The frame is designed to pivot at the center where the front and rear sections meet. The front and rear sections turn in opposing directions so as to force a quicker turning radius of the bicycle. The turning of the bicycle is controlled by a gear and steering cable assembly that connects to two fixed studs on the front and rear sections at the center vertical pivot shaft. The bicycle also has a drive system where by the front and rear axle gears are connected to two center drive sprockets by a fixed bar and pivot system. As disclosed, the invention has particular application to bicycles, but is not limited thereto.

A review of prior art does not disclose any type of front and rear axle drives, that is, a two wheel drive bicycle. There is also not to be found a bicycle that hinges in the center in order to turn.

A review of the prior art such as U.S. Pat. No. 5,290,053 discusses a high-bicycle frame with an elevated seat and handlebar, by inventors Barts and Altman.

Des. Pat. No. 368,679 by Diety and Haney introduces an ornamental design for a bicycle frame, but is the Standard rear wheel and front handlebar type.

U.S. Pat. No. 4,500,013 by Klein introduces a larger diameter tubing to increase the rigidity of a bicycle frame and U.S. Pat, No. 4,921,267 talks about a light weight alloy casting for a bicycle frame.

SUMMARY OF THE INVENTION

The present invention discloses a bicycle that has a two wheel drive capability. The present invention is divided into three separate but intevical parts. The first part is being the bicycle frame that allows the bicycle to have a front and rear drive capability. The second part is the steering or turning mechanism that is achieved by the front and rear bicycle sections pivoting at a center point in opposite directions by means of a gear and steering cable assembly. The third part is a drive system where by two center sprockets are connected to the front and rear axle and gear mechanism by a fixed bar with a pivot capability.

BRIEF DESCRIPTION OF THE DRAWINGS

FIG. 6 shows the handlebar gear assembly and the steering cable assembly.

FIG. 7 shows where the rearward end of the steering cable assembly attaches to the two center steering cable studs.

FIG. 8 shows the center double sprocket assembly, the front wheel gear assembly, the rigid bar connector between them and the double sprocket horizontal pivot points.

DETAILED DESCRIPTION OF THE INVENTION

Figure 1:
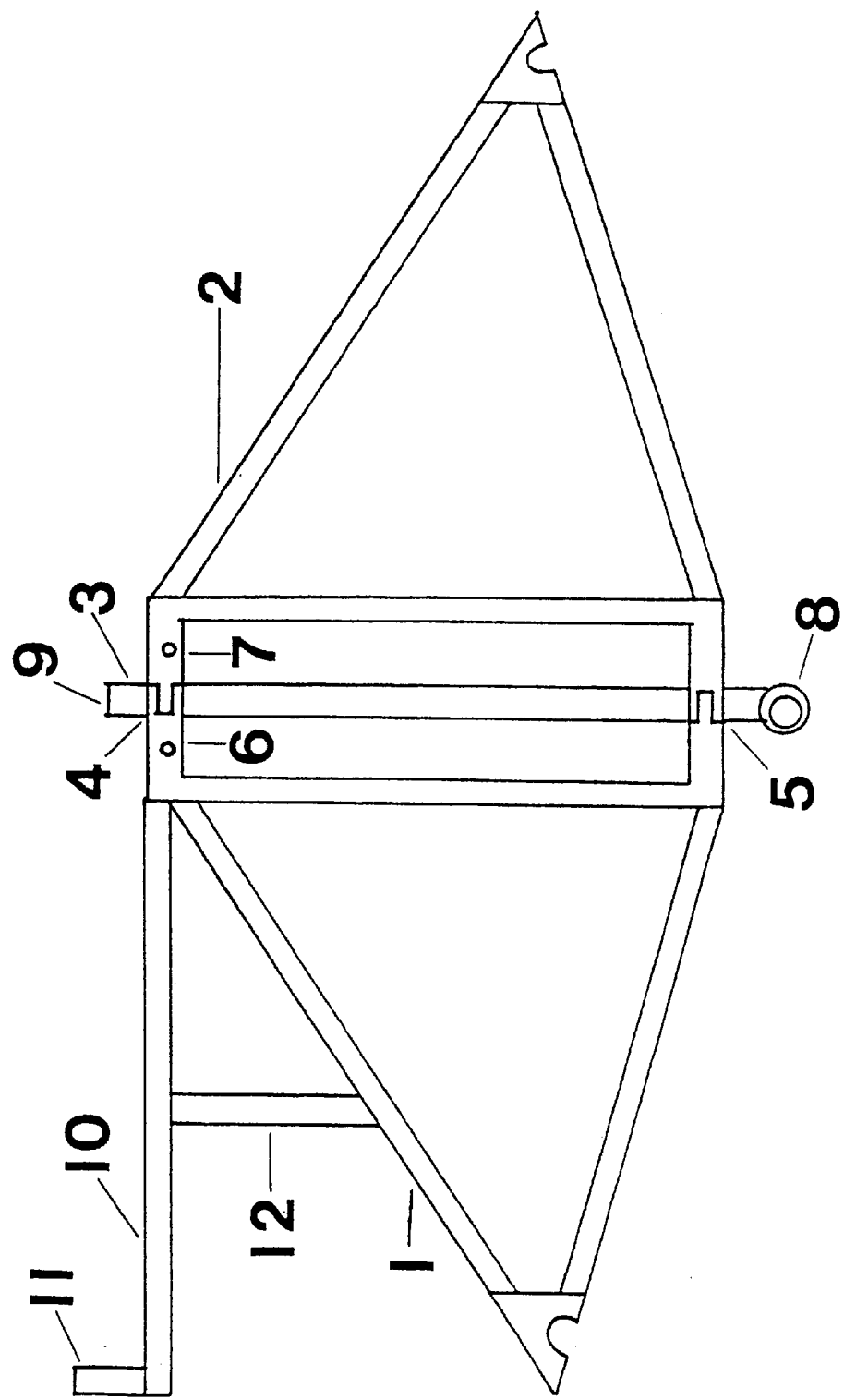
FIG. 1 is a side elevation of the Tommy Two Drive Bicycle frame showing how the front and rear sections meet at the center vertical shaft.

Referring initially to FIG. 1 a side view of the Tommy Two Drive Bicycle depicts how the front half of the bicycle frame 1 meets the rear half of the bicycle frame 2 at the center vertical shaft 3. The center vertical shaft 3 is rigidly fixed to the front half of the bicycle frame 1 and is where the pivot action 4 and 5 takes place with the rear bicycle frame 2. Turning studs 6 and 7 protrude outwardly about three inches from the front and rear bicycle frame halves 1 and 2 and is where the steering cable FIG. 6 attaches.

The double sprocket assembly FIG. 8 attaches to the pedal crank assembly 8.

Each independent sprocket is on either side of the pedal crank assembly and is mounted on a knuckle joint that allows the sprocket to pivot from side to side. On the side of each sprocket as well as at the front and rear gear assemblies is a ring with a raised slot that goes around the ring whereby two ball bearing mini-wheel's fit into said slot with each having a protruding stud that attaches to the rigid bar that connects the sprocket and gear assembly together respectfully keeping the two in alignment.

A seat attaches to the top of the center vertical shaft 3 at 9. A part of the bicycle frame 1 is the forward frame member 10 that supports the handlebar and turning gear assembly FIG. 3. The shorter vertical solid shaft 11 is attached to the front of the forward frame member 10 and is where the handlebar and steering gear FIG. 6 are attached to the frame FIG. 1.

Figure 2:
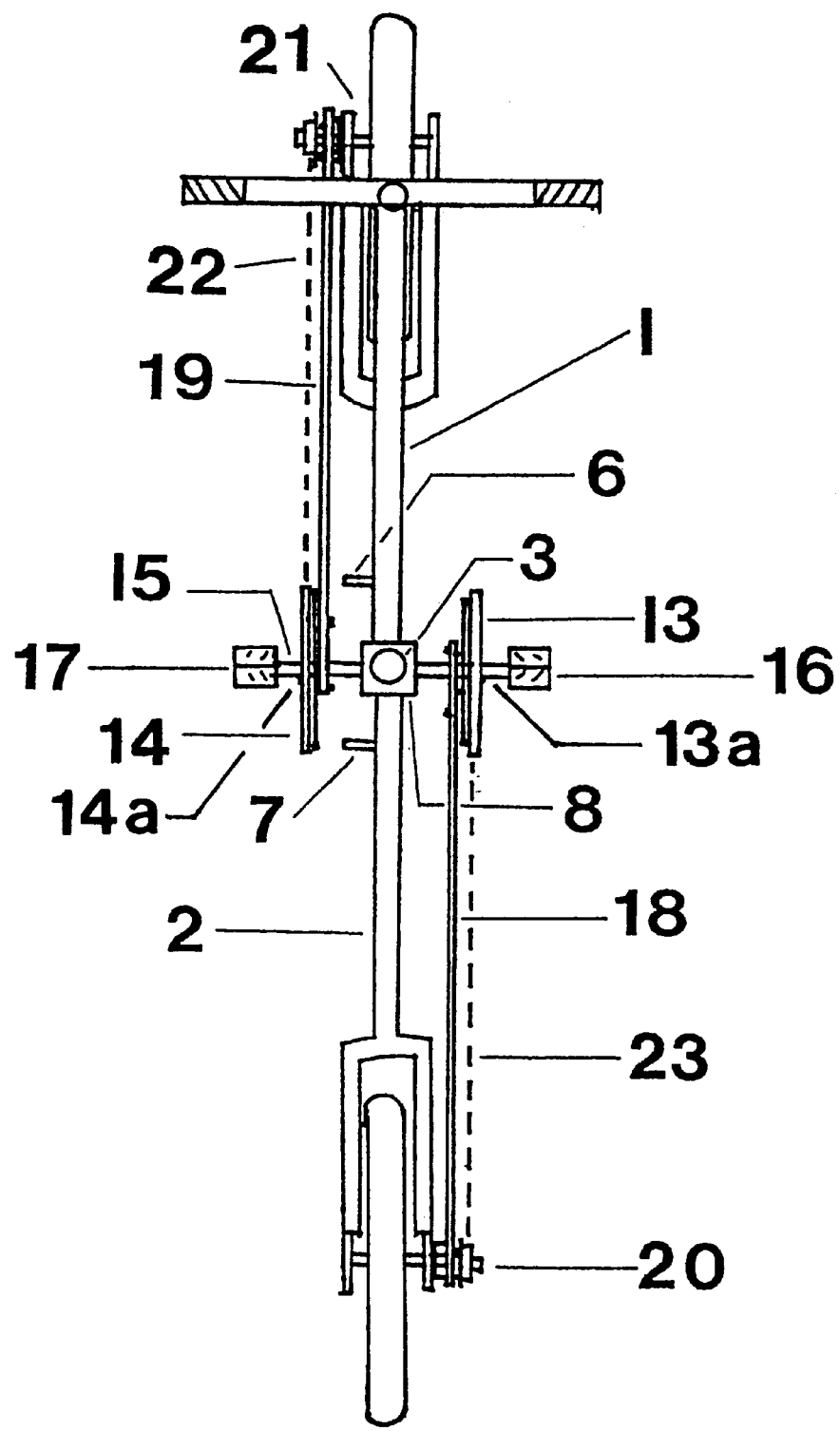
FIG. 2 is a top view of the Tommy Two Drive Bicycle (seat omitted for clarity, as well as the brake and gear systems) showing the relationship of the double sprocket to the front and rear assembly and attachment of the rigid bar between them.

A frame support member 12 gives support to the forward frame member 10. FIG. 2 is a top view showing the relationship of the various parts of the Tommy Two Drive Bicycle. The front and rear bicycle sections 1 and 2 meet at the center vertical shaft 3 where the pivot action occurs. The pedal crank assembly housing 8 is where the double sprocket assemblies 13 and 14 are attached to the knuckle joints 13a and 14a that are attached to the pedal crank shaft 15. Each independent sprocket 13 and 14 is on either side of the pedal crank assembly and is mounted on a knuckle joint 13a and 14a that is attached to the pedal crank shaft 15. This allows the sprockets 13 and 14 to pivot from side to side. On the side of each sprocket as well as the front and rear gear assemblies is a ring with a raised slot that goes around the ring where by two ball-bearing mini-wheels fit into said slot with each having a protruding stud that is threaded on the end so a lock nut can be placed to keep the rigid bar in place.

The studs protrude through sleeves in the rigid bar so as to allow the studs to turn or rotate within the sleeve. The rigid bars 18 and 19 connect the double sprocket assemblies 20 and 21 and allow the gear assemblies 13 and 14 to pivot but to always stay in alignment with the double sprocket assemblies 13 and 14. The pedals 16 and 17 are attached to the ends of the pedal crank 15. By allowing the double sprocket assembly 13 and 14 to pivot horizontally this ensures that the bicycle chains 22 and 23 stay in line with the front and rear gear assemblies. The center steering studs 6 and 7 are shown in relation to the center vertical shaft 3.

Figure 3:
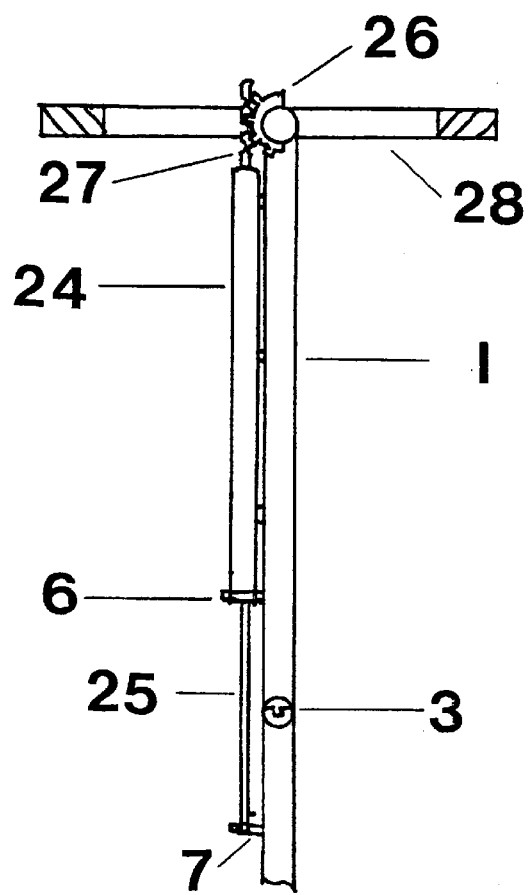
FIG. 3 shows how the steering cable assembly is attached to the forward frame member.

FIG. 3 shows how the steering cable assembly 24 is attached to the forward frame member 1 and rear frame member 2. The steering cable assembly FIG. 3 is made up of an outer housing 24 and an inner shaft 25. The front end of the steering cable assembly 24 is attached to the forward member 1 where the handlebar gear assembly 26 meshes with the notches on the inner steering assembly shaft 27. The rear portion of the steering cable assembly 24 attaches to the steering studs 6 and 7 just in front and rear of the center vertical shaft 3 where the front and rear bicycle halves pivot. The outer housing 24 attaches to the front bicycle half steering stud 6 and the inner shaft attaches to the rear bicycle half steering stud 7. When the handle bars 28 are turned, the inner shaft shortens or extends.

Figure 4:
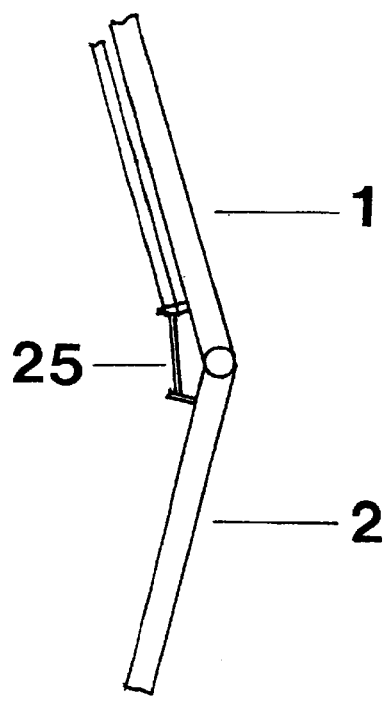
FIG. 4 shows a left turn.
Figure 5:
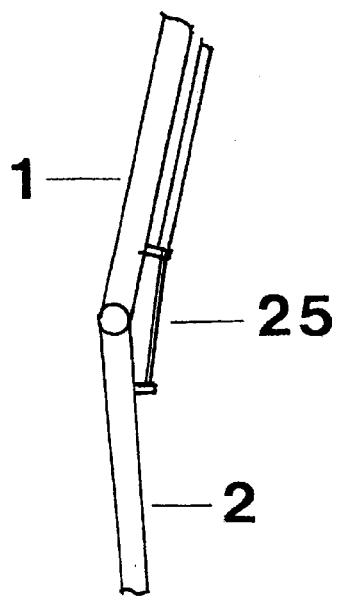
FIG. 5 shows a right turn.

FIG. 4 depicts the inner shaft 25 becoming shorter, thus forcing the front and rear halves 1 and 2 to move in opposing directions, thus forcing a quicker left turn. A right turn FIG. 5 depicts the inner shaft 25 becoming longer, thus forcing the front and rear bicycle halves in opposing directions, thus forcing a quicker right turn.

FIG. 6 shows the handlebar gear assembly 26 and the steering cable assembly 24. The handlebar gear assembly 24 mesh with the inner steering cable notches 27.

FIG. 7 shows where the rearward end of the steering cable assembly 24 attaches to the two center studs 6 and 7 that are attached to the front and rear bicycle halves 1 and 2 where they pivot on the center vertical shaft 3. The fixed outer housing 24 attaches to the front bicycle half 1 steering stud 6 and the inner steering shaft 25 attaches to the rear bicycle half 2 steering stud 7.

FIG. 8 shows the center double sprocket assembly 13 and 14 the front wheel gear assembly 21 the Rigid bar connector between the two 19, one of the bicycle chains 22 and the horizontal double sprocket pivot points 13*a* and 14*a*.

Figure 9:
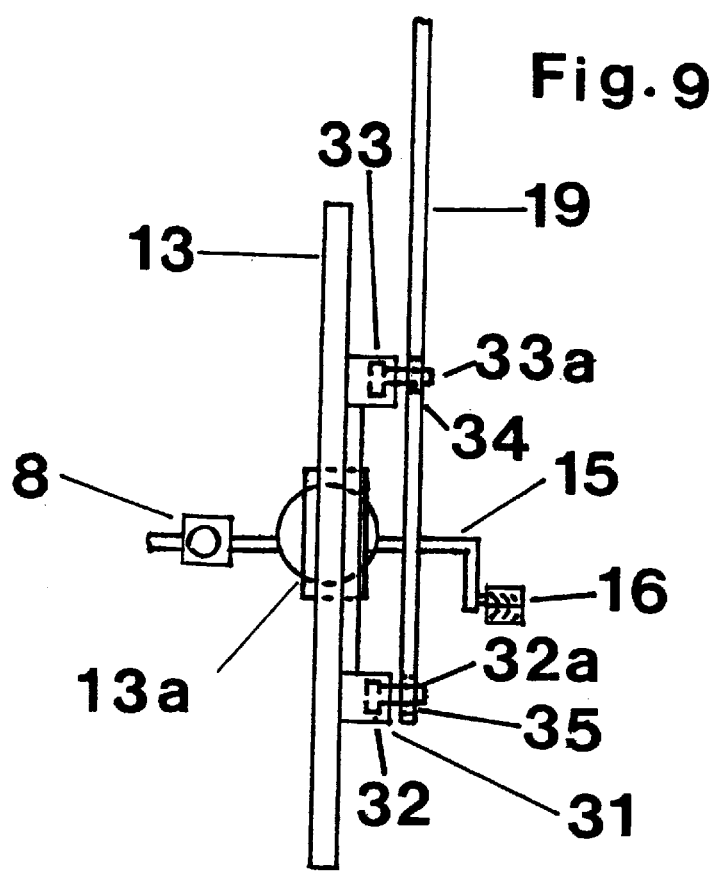
FIG. 9 shows an expanded view of a sprocket attached to a knuckle or ball joint. It also shows the method in which the rigid bar attaches to the sprocket with a ring with a raised slot that goes around the ring where two ball bearing mini-wheels fit into said slot with protruding studs that attach to the rigid bar.

FIG. 9 depicts a top view of the pedal crank assembly 8, the knuckle joint 13*a* and a sprocket 13 where it is attached to the knuckle or ball joint 13*a*. The pedal crank shaft 15 that goes through the knuckle or ball joint 13*a* and sprocket 13 and a pedal 16 that is attached to the end of the pedal crank shaft 15.

The ring with the raised slot 31 is shown attached to the side of the sprocket 13. The two ball bearing mini-wheels 32 and 33 that fit into the raised slot on the ring 31 and the two studs with end nuts 32*a* and 33*a* that fit through the sleeves 34 and 35 that go through the rigid bar that keeps the sprocket and gear assembly in alignment.

The same configuration of the ring with the raised slot that accommodates the ball bearing mini-wheels will be at the front and rear gear assemblies where the rigid bar will attach to keep the gear assemblies and the sprocket assembly aligned.

Figure 10:
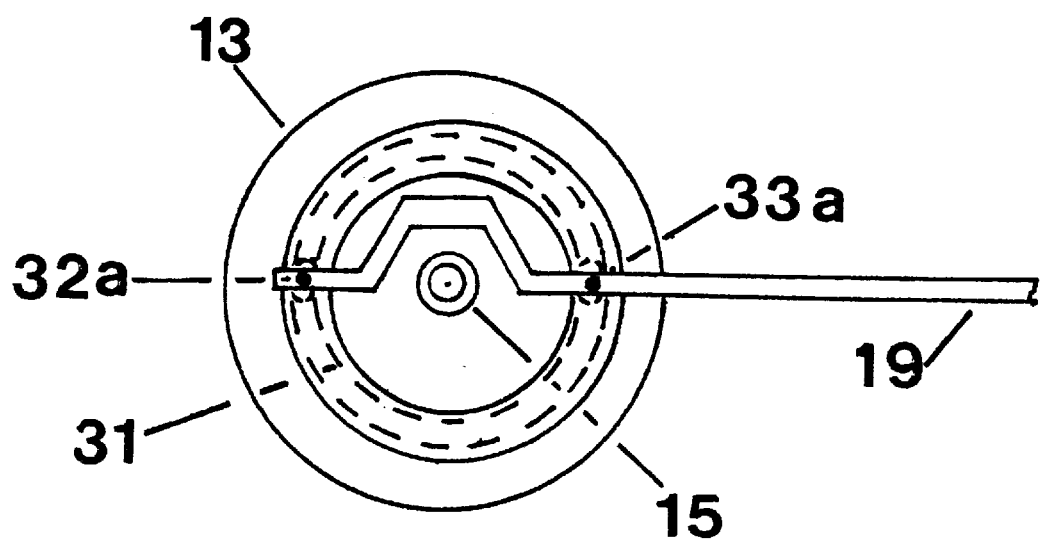
FIG. 10 shows a side view of FIG. 9.

FIG. 10 depicts a side view of FIG. 9 as the ring with the raised slot 31 is attached to the sprocket 13. This figure also shows the rigid bar 19 having an off-set in it so as to clear the pedal crank shaft 15 (pedal not shown for clarity). The ring with the raised slot 31 is shown with the ball bearing mini-wheels 32 and 33, the studs with nuts attached 32*a* and 33*a*.

What is claimed is:

1. A bicycle frame comprising;
   a front bicycle frame half including a center vertical shaft;
   a rear bicycle frame half pivotally connected to the front bicycle frame half;
   a pedal crank assembly mounted to the center vertical shaft;
   and first and second sprockets rotatably mounted to the pedal crank assembly, each sprocket being independently rotatable relative to the other.

2. The bicycle frame of claim 1 wherein each sprocket is mounted to the pedal crank assembly through a knuckle joint.

3. The bicycle frame of claim 1 further comprising:
   a handle bar pivotally mounted to the front half frame;
   a gear assembly mounted to the handle bar;
   an inner steering assembly shaft having a notched end engaged with said gear assembly and a second end attached to a stud projecting from the rear frame half.

4. The bicycle frame of claim 3 further comprising:
   an outer housing fixedly attached to the front half frame and surrounding said inner steering assembly shaft.

5. The bicycle frame of claim 1 further comprising:
   a front sprocket assembly rotationally mounted to the front half frame and connected by a chain to the first sprocket;
   a rear sprocket assembly rotationally mounted to the rear half frame and connected by a chain to the second sprocket.

6. The bicycle frame of claim 5 further comprising:
   a first rigid bar connected between the front sprocket assembly and the first sprocket;
   and a second rigid bar connected between the rear sprocket assembly and the second sprocket.

* * * * *